United States Patent
Simpson et al.

(10) Patent No.: US 11,656,164 B2
(45) Date of Patent: May 23, 2023

(54) AXIALLY-OFFSET DIFFERENTIAL INTERFERENCE CONTRAST CORRELATION SPECTROSCOPY

(71) Applicant: Purdue Research Foundation, West Lafayette, IN (US)

(72) Inventors: Garth Jason Simpson, West Lafayette, IN (US); Chen Li, West Lafayette, IN (US); Changqin Ding, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1 day.

(21) Appl. No.: 17/329,017

(22) Filed: May 24, 2021

(65) Prior Publication Data

US 2022/0026331 A1     Jan. 27, 2022

Related U.S. Application Data

(60) Provisional application No. 63/054,801, filed on Jul. 22, 2020.

(51) Int. Cl.
*G01N 15/02* (2006.01)
*G01J 3/02* (2006.01)
*G01J 3/457* (2006.01)

(52) U.S. Cl.
CPC ........ *G01N 15/0211* (2013.01); *G01J 3/0224* (2013.01); *G01J 3/457* (2013.01); *G01N 15/0227* (2013.01)

(58) Field of Classification Search
CPC .......... G01N 15/0211; G01N 15/0227; G01N 15/0205; G01J 3/0224; G01J 3/457
See application file for complete search history.

(56) References Cited

U.S. PATENT DOCUMENTS

2020/0072745 A1*   3/2020   Simpson .............. G02B 5/3016

OTHER PUBLICATIONS

Ding et al., "Polarization wavefront shaping for quantitative phase contrast imaging by axially-offset differential interference contrast (ADIC)", Proc. of SPIE vol. 10887, pp. 1088728:1-8. (Year: 2019).*

(Continued)

*Primary Examiner* — Rebecca C Bryant
(74) *Attorney, Agent, or Firm* — Maginot, Moore & Beck LLP

(57) ABSTRACT

A method of obtaining a measurement signal representative of the particle size distributions in nanocrystal suspensions that includes a step of providing a first light beam along a first axis to a first micro-retarder array to generate polarization wavefront shaped light. The shaped light is applied to an objective configured to focus two orthogonally polarized components of the polarization wavefront shaped light to produce first and second axially offset foci along the first axis. A sample having particles in suspension is disposed in one foci to produce a measurement optical signal having phase and intensity values corresponding to at least some of the particles in suspension. The method also includes determining intensity and quantitative phase information as a function of time based on the optical signals.

9 Claims, 7 Drawing Sheets

(56) References Cited

OTHER PUBLICATIONS

Ding, Changqin, et al. "Axially-offset differential interference contrast microscopy via polarization wavefront shaping." Optics express 27.4 (2019): 3837-3850.
Abbe, E. (1873). Beiträge zur Theorie des Mikroskops und der mikroskopischen Wahrnehmung. Archiv für mikroskopische Anatomie, 9, 431.
Allen, L., Faulkner, H., Nugent, K., Oxley, M., & Paganin, D. (2001). Phase retrieval from images in the presence of first-order vortices. Physical Review E, 63, 037602.
Allen, L., & Oxley, M. (2001). Phase retrieval from series of images obtained by defocus variation. Optics Communications, 199, 65-75.
Anand, A., Chhaniwal, V. K., & Javidi, B. (2010). Real-time digital holographic microscopy for phase contrast 3D imaging of dynamic phenomena. Journal of Display Technology, 6, 500-505.
Ash, W. M., III, Krzewina, L., & Kim, M. K. (2009). Quantitative imaging of cellular adhesion by total internal reflection holographic microscopy. Applied Optics, 48, H144-H152.
Bacon, G. E. (1966). X-ray and neutron diffraction. Oxford, UK: Pergamon.
Balciunas, T., Melninkaitis, A., Tamosauskas, G., & Sirutkaitis, V. (2008). Time-resolved offaxis digital holography for characterization of ultrafast phenomena in water. Optics Letters, 33, 58-60.
Ban, N., Nissen, P., Hansen, J., Moore, P. B., & Steitz, T. A. (2000). The complete atomic structure of the large ribosomal subunit at 2.4 Å resolution. Science, 289, 905.
Barer, R. (1952). Interference microscopy and mass determination. Nature, 169, 366-367.
Barer, R. (1953). Determination of dry mass, thickness, solid and water concentration in living cells. Nature, 172, 1097-1098.
Barty, A., Nugent, K. A., Paganin, D., & Roberts, A. (1998). Quantitative optical phase microscopy. Optics Letters, 23, 817-819.
Beleggia, M., Schofield, M., Volkov, V., & Zhu, Y. (2004). On the transport of intensity technique for phase retrieval. Ultramicroscopy, 102, 37-49.
Bhaduri, B., Pham, H., Mir, M., & Popescu, G. (2012). Diffraction phase microscopy with white light. Optics Letters, 37, 1094-1096.
Born, M., & Wolf, E. (1999). Principles of optics: Electromagnetic theory of propagation, interference and diffraction of light. Cambridge, New York: Cambridge University Press.
Bracewell, R. N (2000). The fourier transform and its applications (3rd ed.). The McGraw-Hill Companies.
Brochard, F., & Lennon, J. (1975). Frequency spectrum of the flicker phenomenon in erythrocytes. Journal de Physique, 36, 1035-1047.
Brown, A. F., & Dunn, G. A. (1989). Microinterferometry of the movement of dry-matter in fibroblasts. Journal of Cell Science, 92(Pt 3), 379-389.
Bryan, A. K., Goranov, A., Amon, A., & Manalis, S. R. (2010). Measurement of mass, density, and volume during the cell cycle of yeast. Proceedings of the National Academy of Sciences of the United States of America, 107, 999-1004.
Caspi, A., Granek, R., & Elbaum, M. (2000). Enhanced diffusion in active intracellular transport. Physical Review Letters, 85, 5655-5658.
Choi, Y.-S., & Lee, S.-J. (2009). Three-dimensional volumetric measurement of red blood cell motion using digital holographic microscopy. Applied Optics, 48, 2983-2990.
Creath, K. (1988). In E. Wolf (Ed.). Progress in optics (pp. 349-393). New York: Elsevier.
Crha, L, Zakova, J., Ventruba, P., Lousova, E., Pohanka, M., & Huser, M. (2011). Quantitative phase shift evaluation of the sperm head by digital holographic microscopy. Human Reproduction, 26, I134-I135.
Cuche, E., Bevilacqua, F., & Depeursinge, C. (1999). Digital holography for quantitative phase-contrast imaging. Optics Letters, 24, 291-293.
Cuche, E., Marquet, P., & Depeursinge, C. (1999). Simultaneous amplitude-contrast and quantitative phase-contrast microscopy by numerical reconstruction of Fresnel off-axis holograms. Applied Optics, 38, 6994-7001.
Davies, H., & Wilkins, M. (1952). Interference microscopy and mass determination. Nature, 169, 541.
Ding, H. F., Berl, E., Wang, Z., Millet, L. J., Gillette, M. U., Liu, J. M., et al. (2010a). Fourier transform light scattering of biological structure and dynamics. IEEE Journal of Selected Topics in Quantum Electronics, 16, 909-918.
Ding, H., Millet, L. J., Gillette, M. U., & Popescu, G. (2010). Actin-driven cell dynamics probed by Fourier transform light scattering. Biomedical Optics Express, 1, 260.
Ding, H., Nguyen, F., Boppart, S. A., & Popescu, G. (2009). Optical properties of tissues quantified by Fourier transform light scattering. Optics Letters, 34, 1372.
Ding, H. F., & Popescu, G. (2010). Instantaneous spatial light interference microscopy. Optics Express, 18, 1569-1575.
Ding, H. F., Wang, Z., Nguyen, F. T., Boppart, S. A., Millet, L. J., Gillette, M. U., et al. (2010b). Fourier transform light scattering (FTLS) of cells and tissues Journal of Computational and Theoretical Nanoscience, 7, 2501-2511.
Ding, H. F., Wang, Z., Nguyen, F., Boppart, S. A., & Popescu, G. (2008). Fourier transform light scattering of inhomogeneous and dynamic structures. Physical Review Letters, 101, 238102.
Dunn, G. A., & Zicha, D. (1995). Dynamics of fibroblast spreading. Journal of Cell Science, 108, 1239.
Dunn, G. A., Zicha, D., & Fraylich, P. E. (1997). Rapid, microtubule-dependent fluctuations of the cell margin. Journal of Cell Science, 110, 3091-3098.
Ferraro, P., Alferi, D., De Nicola, S., De Petrocellis, L., Finizio, A., & Pierattini, G. (2006). Quantitative phase-contrast microscopy by a lateral shear approach to digital holographic image reconstruction. Optics Letters, 31, 1405-1407.
Ferraro, P., Grilli, S., Alfieri, D., De Nicola, S., Finizio, A., Pierattini, G., et al. (2005). Extended focused image in microscopy by digital holography. Optics Express, 13, 6738-6749.
Gabor, D. (1946). Theory of communication. Journal of the Institute of Electrical Engineers, 93, 329.
Gabor, D. (1948). A new microscopic principle. Nature, 161, 777.
Gao, P., Harder, I., Nercissian, V., Mantel, K., & Yao, B. (2010). Common path phase shifting microscopy based on grating diffraction. Optics Letters, 35, 712.
Garcia-Sucerquia, J., Xu, W., Jericho, S. K., Klages, P., Jericho, M. H., & Kreuzer, H. J. (2006). Digital in-line holographic microscopy. Applied Optics, 45, 836-850.
Glauber, R. J. (1963). The quantum theory of optical coherence. Physical Review, 130, 2529.
Godin, M., Delgado, F. F., Son, S., Grover, W. H., Bryan, A. K., Tzur, A., et al. (2010). Using buoyant mass to measure the growth of single cells. Nature Methods, 7, 387-390.
Goodman, J. W. (2000). Statistical optics. New York: Wiley.
Goodman, J. W. (2005). Introduction to Fourier optics. Greenwood Village, Colorado: Roberts & Company.
Goodman, J. W., & Lawrence, R. W. (1967). Digital image formation from electronically detected holograms. Applied Physics Letters, 11, 77-79.
Gureyev, T. E., & Nugent, K. A. (1997). Rapid quantitative phase imaging using the transport of intensity equation. Optics Communications, 133, 339-346.
Hammer, M., Schweitzer, D., Michel, B., Thamm, E., & Kolb, A. (1998). Single scattering by red blood cells. Applied Optics, 37, 7410-7418.
Hariharan, P. (2002). Basics of holography. Cambridge, UK, New York, NY: Cambridge University Press.
Hillman, T. R., Alexandrov, S. A., Gutzler, T., & Sampson, D. D. (2006). Microscopic particle discrimination using spatially-resolved Fourier-holographic light scattering angular spectroscopy. Optics Express, 14, 11088-11102.
Hogenboom, D. O., & DiMarzio, C. A. (1998). Quadrature detection of a Doppler signal. Applied Optics, 37, 2569-2572.
Hogenboom, D. O., DiMarzio, C. A., Gaudette, T. J., Devaney, A. J., & Lindberg, S. C. (1998). Threedimensional images generated by quadrature interferometry. Optics Letters, 23, 783-785.

(56) References Cited

OTHER PUBLICATIONS

Ikeda, T., Popescu, G., Dasari, R. R., & Feld, M. S. (2005). Hilbert phase microscopy for investigating fast dynamics in transparent systems. Optics Letters, 30, 1165-1167.
Indebetouw, G., Tada, Y., Rosen, J., & Brooker, G. (2007). Scanning holographic microscopy with resolution exceeding the Rayleigh limit of the objective by superposition of offaxis holograms. Applied Optics, 46, 993-1000.
Kadono, H., Ogusu, M., & Toyooka, S. (1994). Phase-shifting common-path interferometer using a liquid-crystal phase modulator. Optics Communications, 110, 391-400.
Kemmler, M., Fratz, M., Giel, D., Saum, N., Brandenburg, A., & Hoffmann, C. (2007). Noninvasive time-dependent cytometry monitoring by digital holography. Journal of Biomedical Optics, 12, 064002-1.
Kemper, B., & von Bally, G. (2008). Digital holographic microscopy for live cell applications and technical inspection. Applied Optics, 47, A52-A61.
Khintchine, A. (1934). Korrelationstheorie der stationaren stochastischen Prozesse. Mathematische Annalen, 109, 604-615.
Kim, M. K. (2010). Applications of digital holography in biomedical microscopy. Journal of the Optical Society of Korea, 14, 77-89.
Kong, J. A. (2008). Electromagnetic wave theory. Cambridge, MA: EMW Publishing.
Kou, S. S., & Sheppard, C. J. R. (2007). Imaging in digital holographic microscopy. Optics Express, 15, 13640-13648.
Kou, S. S., Waller, L., Barbastathis, G., Marquet, P., Depeursinge, C., & Sheppard, C. J. R. (2011). Quantitative phase restoration by direct inversion using the optical transfer function. Optics Letters, 36, 2671-2673.
Kou, S. S., Waller, L., Barbastathis, G., & Sheppard, C. J. R. (2010). Transport-of-intensity approach to differential interference contrast (TI-DIC) microscopy for quantitative phase imaging. Optics Letters, 35, 447-449.
Kozacki, T., Krajewski, R., & Kujawinska, M. (2009). Reconstruction of refractive-index distribution in off-axis digital holography optical diffraction tomographic system. Optics Express, 17, 13758-13767.
Langehanenberg, P., Kemper, B., Dirksen, D., & von Bally, G. (2008). Autofocusing in digital holographic phase contrast microscopy on pure phase objects for live cell imaging. Applied Optics, 47, D176-D182.
Langevin, P. (1908). On the theory of Brownian motion. Comptes Rendus de L Academie des Sciences (Paris), 146, 530.
Liu, C., Liu, Z. G., Bo, F., Wang, Y., & Zhu, J. Q. (2002). Super-resolution digital holographic imaging method. Applied Physics Letters, 81, 3143-3145.
Lue, N., Bewersdorf, J., Lessard, M. D., Badizadegan, K., Dasari, R. R., Feld, M. S., et al. (2007a). Tissue refractometry using Hilbert phase microscopy. Optics Letters, 32, 3522-3524.
Lue, N., Choi, W., Badizadegan, K., Dasari, R. R., Feld, M. S., & Popescu, G. (2008). Confocal diffraction phase microscopy of live cells. Optics Letters, 33, 2074-2076.
Lue, N., Choi, W., Popescu, G., Ikeda, T., Dasari, R. R., Badizadegan, K., et al. (2007b). Quantitative phase imaging of live cells using fast Fourier phase microscopy. Applied Optics, 46, 1836-1842.
Lue, N., Choi, W., Popescu, G., Yaqoob, Z., Badizadegan, K., Dasari, R. R., et al. (2009). Live cell refractometry using Hilbert phase microscopy and confocal reflectance microscopy. Journal of Physical Chemistry A, 113, 13327-13330.
Lue, N., Popescu, G., Ikeda, T., Dasari, R. R., Badizadegan, K., & Feld, M. S. (2006). Live cell refractometry using microfluidic devices. Optics Letters, 31, 2759-2761.
Mandel, L., & Wolf, E. (1995). Optical coherence and quantum optics. Cambridge, New York: Cambridge University Press.
Mann, C. J., Yu, L. F., & Kim, M. K. (2006). Movies of cellular and sub-cellular motion by digital holographic microscopy. Biomedical Engineering Online, 5, 21.
Mann, C. J., Yu, L. F., Lo, C. M., & Kim, M. K. (2005). High-resolution quantitative phasecontrast microscopy by digital holography. Optics Express, 13, 8693-8698.
Marquet, P., Rappaz, B., Magistretti, P. J., Cuche, E., Emery, Y., Colomb, T., et al. (2005). Digital holographic microscopy: A noninvasive contrast imaging technique allowing quantitative visualization of living cells with subwavelength axial accuracy. Optics Letters, 30, 468-470.
McNally, J. G., Karpova, T., Cooper, J., & Conchello, J. A. (1999). Three-dimensional imaging by deconvolution microscopy. Methods—A Companion to Methods in Enzymology, 19, 373-385.
Mico, V., Zalevsky, Z., & Garcia, J. (2008). Common-path phase-shifting digital holographic microscopy: A way to quantitative phase imaging and superresolution. Optics Communications, 281, 4273-4281.
Mico, V., Zalevsky, Z., Garcia-Martinez, P., & Garcia, J. (2006). Synthetic aperture superresolution with multiple off-axis holograms. Journal of the Optical Society of America A—Optics Image Science and Vision, 23, 3162-3170.
Mir, M., Tangella, K., & Popescu, G. (2011). Blood testing at the single cel level using quantitative phase and amplitude microscopy. Biomedical Optics Express, 2, 3259-3266.
Mir, M., Wang, Z., Shen, Z., Bednarz, M., Bashir, R., Golding, I., et al. (2011). Optical measurement of cycle-dependent cell growth. Proceedings of the National Academy of Sciences of the United States of America, 108, 13124-13129.
Mir, M., Wang, Z., Tangella, K., & Popescu, G. (2009). Diffraction phase cytometry: Blood on a CD-ROM. Optics Express, 17, 2579-2585.
Moon, I., & Javidi, B. (2007). Three-dimensional identification of stem cells by computational holographic imaging. Journal of the Royal Society Interface, 4, 305-313.
Newmark, J. A., Warger, W. C., Chang, C., Herrera, G. E., Brooks, D. H., DiMarzio, C. A., et al. (2007). Determination of the number of cells in preimplantation embryos by using noninvasive optical quadrature microscopy in conjunction with differential interference contrast microscopy. Microscopy and Microanalysis, 13, 118-127.
Ng, A. Y. M., See, C. W., & Somekh, M. G. (2004). Quantitative optical microscope with enhanced resolution using a pixelated liquid crystal spatial light modulator. Journal of Microscopy—Oxford, 214, 334-340.
Nyquist, H. (1928). Certain topics in telegraph transmission theory. Transactions of the American Institute of Electrical Engineers, 47, 617-644.
Paganin, D., & Nugent, K. (1998). Noninterferometric phase imaging with partially coherent light. Physical Review Letters, 80, 2586-2589.
Palacios, F., Ricardo, J., Palacios, D., Goncalves, E., Valin, J. L., & De Souza, R. (2005). 3D image reconstruction of transparent microscopic objects using digital holography. Optics Communications, 248, 41-50.
Park, Y., Best, C. A., Badizadegan, K., Dasari, R. R., Feld, M. S., Kuriabova, T., et al. (2010a). Measurement of red blood cell mechanics during morphological changes. Proceedings of the National Academy of Sciences of the United States of America, 107, 6731-6736.
Park, Y., Diez-Silva, M., Popescu, G., Lykotrafitis, G., Choi, W., Feld, M. S., et al. (2008). Retractive index maps and membrane dynamics of human red blood cells parasitized by Plasmodium falciparum. Proceedings of the National Academy of Sciences of the United States of America, 105, 13730-13735.
Park, K., Millet, L. J., Kim, N., Li, H., Jin, X., Popescu, G., et al. (2010b). Measurement of adherent cell mass and growth. Proceedings of the National Academy of Sciences of the United States of America, 107, 20691-20696.
Park, Y., Popescu, G., Badizadegan, K., Dasari, R. R., & Feld, M. S. (2006). Diffraction phase and fluorescence microscopy. Optics Express, 14, 8263-8268.
Park, Y., Popescu, G., Badizadegan, K., Dasari, R. R., & Feld, M. S. (2007). Fresnel particle tracing in three dimensions using diffraction phase microscopy. Optics Letters, 32, 811-813.

(56) References Cited

OTHER PUBLICATIONS

Parshall, D., & Kim, M. K. (2006). Digital holographic microscopy with dual-wavelength phase unwrapping. Applied Optics, 45, 451-459.
Paturzo, M., Merola, F., Grilli, S., De Nicola, S., Finizio, A., & Ferraro, P. (2008). Superresolution in digital holography by a two-dimensional dynamic phase grating. Optics Express, 16, 17107-17118.
Pavilion, N., Arfire, C., Bergoend, I., & Depeursinge, C. (2010). Iterative method for zeroorder suppression in off-axis digital holography. Optics Express, 18, 15318-15331.
Pawley, J. B. (2006). Handbook of biological confocal microscopy. New York: Springer.
Popescu, G. (2011). Quantitative phase imaging of cells and tissues. New York: McGraw-Hill.
Popescu, G., Badizadegan, K., Dasari, R. R., & Feld, M. S. (2005). Imaging erythrocyte dynamic subdomains by Fourier phase microscopy. Faseb Journal, 19, A684.
Popescu, G., Badizadegan, K., Dasari, R. R., & Feld, M. S. (2006a). Observation of dynamic subdomains in red blood cells. Journal of Biomedical Optics, 11, 040503-1-040503-3.
Popescu, G., Deflores, L. P., Vaughan, J. C., Badizadegan, K., Iwai, H., Dasari, R. R., et al. (2004). Fourier phase microscopy for investigation of biological structures and dynamics. Optics Letters, 29, 2503-2505.
Popescu, G., Ikeda, T., Best, C. A., Badizadegan, K., Dasari, R. R., & Feld, M. S. (2005). Erythrocyte structure and dynamics quantified by Hilbert phase microscopy. Journal of Biomedical Optics, 10.
Popescu, G., Ikeda, T., Dasari, R. R., & Feld, M. S. (2006b). Diffraction phase microscopy for quantifying cell structure and dynamics. Optics Letters, 31, 775-777.
Popescu, G., Ikeda, T., Goda, K., Best-Popescu, C. A., Laposata, M., Manley, S., et al. (2006c). Optical measurement of cell membrane tension. Physical Review Letters, 97.
Popescu, G., Park, Y., Lue, N., Best-Popescu, C., Deflores, L., Dasari, R. R., et al. (2008). Optical imaging of cell mass and growth dynamics. American Journal of Physiology—Cell Physiology, 295, C538-C544.
Price, J. R., Bingham, P. R., & Thomas, C. E. Jr., (2007). Improving resolution in microscopic holography by computationally fusing multiple, obliquely illuminated object waves in the Fourier domain. Applied Optics, 46, 827-833.
Provan, D., Singer, C. R. J., Baglin, T., & Lilleyman, J. (2004). Oxford handbook of clinical haematology. Oxford, United Kingdom: Oxford University Press.
Purves, W. K. (2004). Life, the science of biology. Sundedand, Mass.: Sinauer Associates.
Rappaz, B., Cano, E., Colomb, T., Kuehn, J., Depeursinge, C., Simanis, V., et al. (2009a). Noninvasive characterization of the fission yeast cell cycle by monitoring dry mass with digital holographic microscopy. Journal of Biomedical Optics, 14.
Reed Teague, M. (1983). Deterministic phase retrieval: A Green's function solution. JOSA, 73, 1434-1441.
Reshes, G., Vanounou, S., Fishov, I., & Feingold, M. (2008). Cell shape dynamics in *Escherichia coli*. Biophysical Journal, 94, 251-264.
Schnars, U., & Jueptner, W. (2005). Digital holography: Digital hologram recording, numerical reconstruction, and related techniques. Bedin, Heidelberg: Springer-Verlag.
Schnars, U., & Jüptner, W. (1994). Direct recording of holograms by a CCD target and numerical reconstruction. Applied Optics, 33, 179-181.
Shaked, N. T., Finan, J. D., Guilak, F., & Wax, A. (2010). Quantitative phase microscopy of articular chondrocyte dynamics by wide-field digital interferometry. Journal of Biomedical Optics, 15.
Shaked, N. T., Newpher, T. M., Ehlers, M. D., & Wax, A. (2010). Parallel on-axis holographic phase microscopy of biological cells and unicellular microorganism dynamics. Applied Optics, 49, 2872-2878.

Shannon, C. E. (1949). Communication in the presence of noise. Proceedings of the IRE, 37, 10-21.
Sridharan, S., Mir, M., & Popescu, G. (2011). Simultaneous optical measurement of cell motility and growth. Biomedical Optics Express, 2, 2815-2820.
Streibl, N. (1984). Phase imaging by the transport equation of intensity. Optics Communications, 49, 6-10.
Sun, H., Song, B., Dong, H., Reid, B., Player, M. A., Watson, J., et al. (2008). Visualization of fast-moving cells in vivo using digital holographic video microscopy. Journal of Biomedical Optics, 13, 014007.
Takeda, M., Ina, H., & Kobayashi, S. (1982). Fourier-transform method of fringe-pattern analysis for computer-based topography and interferometry. JOSA, 72, 156-160.
Trepat, X., Deng, L. H., An, S. S., Navajas, D., Tschumperlin, D. J., Gerthoffer, W. T., et al. (2007). Universal physical responses to stretch in the living cell. Nature, 447, 592-595.
Tzur, A., Kafri, R., LeBleu, V. S., Lahav, G., & Kirschner, M. W. (2009). Cell growth and size homeostasis in proliferating animal cells. Science, 325, 167-171.
Wang, Z., Balla, A., Tangella, K., & Popescu, G. (2011a). Tissue refractive index as marker of disease. Journal of Biomedical Optics, 16, 116017-1-116017-5.
Wang, Z., Chun, I. S., Li, X. L., Ong, Z. Y., Pop, E., Millet, L., et al. (2010). Topography and refractometry of nanostructures using spatial light interference microscopy. Optics Letters, 35, 208-210.
Wang, Z., Marks, D. L., Carney, P. S., Millet, L. J., Gillette, M. U., Mihi, A., et al. (2011b). Spatial light interference tomography (SLIT) Optics Express, 19, 19907-19918.
Wang, Z., Millet, L., Chan, V., Ding, H. F., Gillette, M. U., Bashir, R., et al. (2011c). Labelfree intracellular transport measured by spatial light interference microscopy. Journal of Biomedical Optics, 16.
Wang, Z., Millet, L., Mir, M., Ding, H. F., Unarunotai, S., Rogers, J., et al. (2011d). Spatial light interference microscopy (SLIM). Optics Express, 19, 1016-1026.
Wang, Z., & Popescu, G. (2010). Quantitative phase imaging with broadband fields. Applied Physics Letters, 96.
Wang, R., Wang, Z., Leigh, J., Sobh, N., Millet, L., Gillette, M. U., et al. (2011f). Onedimensional deterministic transporl in neurons measured by dispersion-relation phase spectroscopy. Journal of Physics—Condensed Matter, 23.
Wang, R., Wang, Z., Millet, L., Gillette, M. U., Levine, A. J., & Popescu, G. (2011g). Dispersion-relation phase spectroscopy of intracellular transport. Optics Express, 19, 20571-20579.
Warger, W. C., & DiMarzio, C. A. (2009). Computational signal-to-noise ratio analysis for optical quadrature microscopy. Optics Express, 17, 2400-2422.
Warger, W. C., Laevsky, G. S., Townsend, D. J., Rajadhyaksha, M., & DiMarzio, C. A. (2007). Multimodal optical microscope for detecting viability of mouse embryos in vitro. Journal of Biomedical Optics, 12, 044006.
Warger, W. C., IINewmark, J. A., Warner, C. M., & DiMarzio, C. A. (2008). Phase-subtraction cell-counting method for live mouse embryos beyond the eight-cell stage. Journal of Biomedical Optics, 13.
Warnasooriya, N., Joud, F., Bun, P., Tessier, G., Coppey-Moisan, M., Desbiolles, P., et al. (2010). Imaging gold nanoparticles in living cell environments using heterodyne digital holographic microscopy. Optics Express, 18, 3264-3273.
Watson, J. D., & Crick, F. H. C. (1953). Molecular structure of nucleic acids. Nature, 171, 737-738.
Weitzman, J. B. (2003). Growing without a size checkpoint. Journal of Biology, 2, 3.
Wiener, N. (1930). Generalized harmonic analysis. Acta Mathematica, 55, 117-258.
Wolf, E. (1969). Three-dimensional structure determination of semi-transparent objects from holographic data. Optics Communications, 1, 153.
Wolf, E. (2007). Introduction to the theory of coherence and polarization of light. Cambridge: Cambridge University Press. 141.

(56) References Cited

OTHER PUBLICATIONS

Wolf, E. (2009). Solution of the phase problem in the theory of structure determination of crystals from X-ray diffraction experiments. Physical Review Letters, 103.

Wright, S. J, & Wright, D. J (2002). Introduction to confocal microscopy. Cell biological applications of confocal microscopy, (2nd ed., vol. 70, pp. 2-81). San Diego, California, USA: Academic Press.

Xu, W. B., Jericho, M. H., Meinertzhagen, I. A., & Kreuzer, H. J. (2001). Digital in-line holography for biological applications. Proceedings of the National Academy of Sciences of the United States of America, 98, 11301-11305.

Yildiz, A., Forkey, J. N., McKinney, S. A., Ha, T., Goldman, Y. E., & Selvin, P. R. (2003). Myosin V walks hand-over-hand: Single fluorophore imaging with 1.5-nm localization. Science, 300, 2061-2065.

Zernike, F. (1942a). Phase contrast, a new method for the microscopic observation of transparent objects, Part 2. Physica, 9, 974-986.

Zernike, F. (1942b). Phase contrast, a new method for the microscopic observation of transparent objects, Part 1. Physica, 9, 686-698.

Zernike, F. (1955). How I discovered phase contrast. Science, 121, 345-349.

Zhu, L. W., Zhou, C. H., Wu, T. F., Jia, W., Fan, Z. W., Ma, Y. F., et al. (2010). Femtosecond off-axis digital holography for monitoring dynamic surface deformation. Applied Optics, 49, 2510-2518.

Zicha, D., & Dunn, G. A. (1995). An image-processing system for cell behavior studies in subconfluent cultures. Journal of Microscopy—Oxford, 179, 11-21.

Zicha, D., Genot, E., Dunn, G. A., & Kramer, I. M. (1999). TGF beta 1 induces a cell-cycledependent increase in motility of epithelial cells. Journal of Cell Science, 112, 447-454.

Zilker, A., Engelhardt, H., & Sackmann, E. (1987). Dynamic reflection interference contrast (Ric-) microscopy—A new method to study surface excitations of cells and to measure membrane bending elastic-moduli. Journal de Physique, 48, 2139-2151.

\* cited by examiner

AXIALLY-OFFSET DIFFERENTIAL INTERFERENCE CONTRAST CORRELATION SPECTROSCOPY

CROSS-REFERENCE TO RELATED APPLICATIONS

The present U.S. patent application is related to and claims the priority benefit of U.S. Provisional Patent Application Ser. No. 63/054,801, filed Jul. 22, 2020, the contents of which is hereby incorporated by reference in its entirety into this disclosure.

This invention was made with government support under GM-103401 awarded by the National Institutes of Health; and GM-103910 awarded by the National Institutes of Health. The government has certain rights in the invention.

BACKGROUND

This section introduces aspects that may help facilitate a better understanding of the disclosure. Accordingly, these statements are to be read in this light and are not to be understood as admissions about what is or is not prior art.

Protein crystallization is the process of formation of a regular array of individual protein molecules stabilized by crystal contacts. These crystals can be used in structural biology to study the molecular structure of the protein, particularly for various industrial or medical purposes. Such studies can involve characterizing aspects of crystals in a suspension.

Large protein crystals are preferred for such studies. However, it can be difficult to obtain well-ordered large protein single crystals. Sub-micron crystals can be obtained more readily and are a common natural phenomenon, but often escape structure determination because of their small diffracting volume. Moreover, current methods use ion tagging of in the structure determining process, and sub-micron crystals have a low tolerated radiation dose of typically tens of MGy, which prohibits the measurement of sufficient signal.

What is needed is a method and/or apparatus for performing particle analysis for particles n a medium that is suitable for smaller particles, which can include submicron protein crystals

SUMMARY

At least some embodiments herein address the above-stated needs, as well as others by implementing axially-offset differential interference contrast (ADIC) microscopy to obtain optical signals representative of interaction of particles in suspension with polarized light over time, and determining characteristics of the particles based on the optical signals.

A first embodiment is a method of obtaining a measurement signal representative of the particle size distributions in nanocrystal suspensions that includes a step of providing a first light beam along a first axis to a first micro-retarder array to generate polarization wavefront shaped light. The polarization wavefront shaped light is applied to an objective configured to focus two orthogonally polarized components of the polarization wavefront shaped light to produce first and second axially offset foci along the first axis. A sample having particles in suspension is disposed in at least one of the first and second axially offset foci to produce a measurement optical signal having phase and intensity values corresponding to at least some of the particles in suspension. The method further includes applying the measurement optical signal to a second objective and a second micro-retarder to generate recombined light, and generating electrical measurement signals representative of the measurement optical signals over time from the recombined light. The method also includes determining intensity and quantitative phase information as a function of time based on the electrical measurement signals.

The above described features and advantages, as well as others, will become more readily apparent to those of ordinary skill in the art by reference to the following detailed description and accompanying drawings.

BRIEF DESCRIPTION

DETAIL DESCRIPTION

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Figure 1:
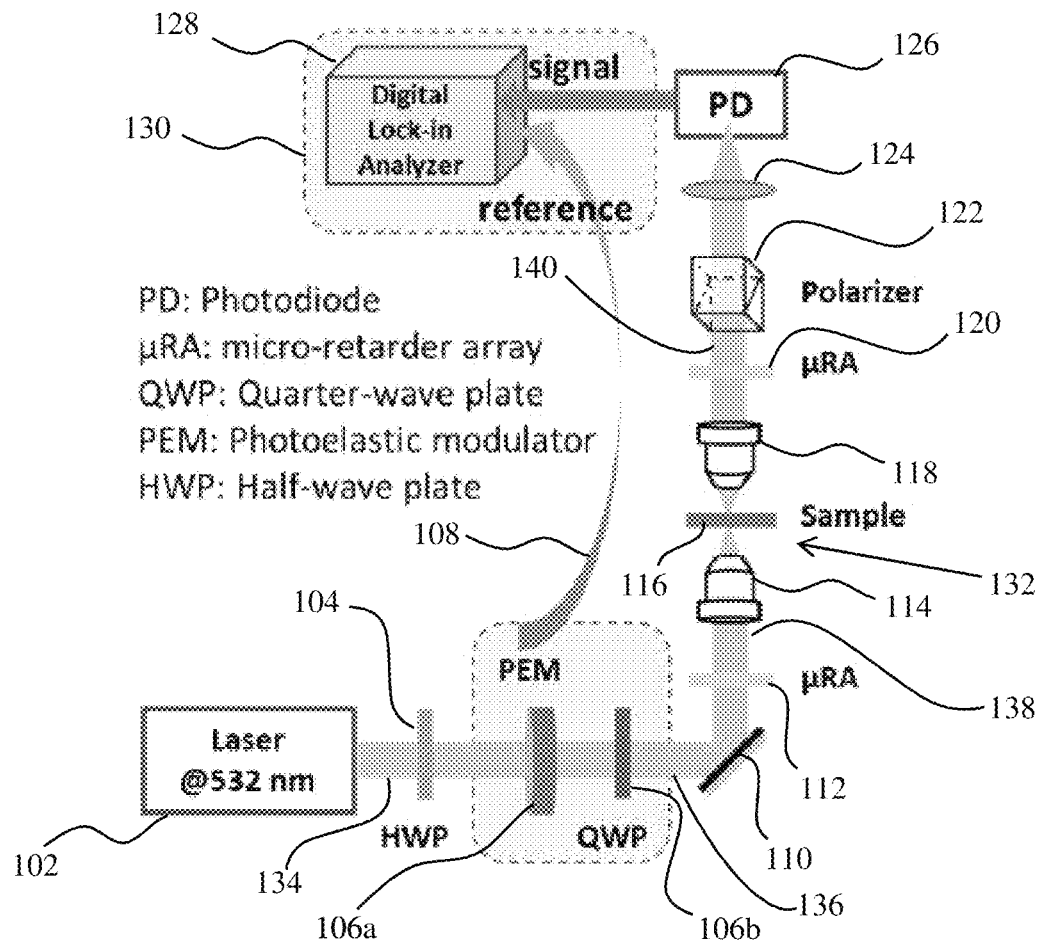
FIG. 1 shows a block diagram of an exemplary system for generating an optical signal representative of the particle size distributions in nanocrystal suspensions.

FIG. 1 shows an exemplary system 100 for generating obtaining an optical signal representative of the particle size distributions in nanocrystal suspensions. In general, the system includes an axially-offset differential interference contrast microscope (ADIC) 101 and a digital analyzer 130. The particles in suspension are depicted as the sample 116 of FIG. 1.

In general, the ADIC 101 is configured to generate polarized light through a sample having particles in suspension and generate optic signals containing both intensity information and quantitative phase information (QPI). In general, the ADIC 101 is configured to develop QPI via polarization wavefront shaping using a matched pair of micro-retarder arrays (μRAs). The μRA is a lab designed optic with radially distributed patterns that can introduce half-wave retardance with the azimuthal orientation of the fast-axis varying spatially at different positions. After passing through the μRA, the wavefront of linearly polarized incident light is identical to that produced by the interference between a slightly diverging right circularly polarized (RCP) plane wave and a slightly converging left circularly polarized (LCP) plane wave. After focused with objective, two foci with axial offset (of 70 μm, for example) are generated with orthogonally polarized component, serving as sample plane and reference plane. Two strategies, including half wave plate (HWP) rotation and lock-in amplified detection can be used in ADIC microscopy for simultaneous quantitative phase image and transmittance (bright-field) image retrieval.

The digital analyzer 130 is configured to digitize the electrical signals (containing the optical measurement information) received from the ADIC 101, and generate particle size information and absolute refractive index information regarding the particles in suspension. To this end, the digital analyzer 130 preferably is configured to generate correlograms of contemporaneous intensity and quantitative phase information based on the received optical signals over time. The digital analyzer 130 is further configured to determine the particle size information and absolute refractive index from the correlograms using known mathematical techniques.

Referring again to the ADIC 101, the ADIC 101 in this environment includes, operably optically serially connected, a light beam source 102, a half-wave plate (HWP) 104, a photoelastic modulator 106a, a quarter wave plate (QWP) 106b, a reflector 110, a first microretarder 112, a first objective 114, a second objective 118, a second microretarder 120, a polarizer 122, an optional lens 124, and a photodiode 126.

In general, the ADIC 101 in one embodiment is constructed based on a bright field microscope frame with the addition of several polarizing optics, including HWP 104, QWP 106b, and polarizer 122. In this embodiment, the light beam source 102 comprises a 532 nm continuous laser (Millenia Vs J) which is operably connected to provide the light beam to the HWP 104. The light beam source 102 is configured in this example to provide an average laser power on the sample of around 5 mW.

The HWP 104 is rotatably mounted in a rotation stage for linear polarization modulation of the incident light beam. The photoelastic modulator (PEM) 106a in this embodiment is a Hinds instrument model PEM-90M. The light beam source 102 is configured and operably connected to expand the beam from the QWP 106b to 15 mm in diameter so that it fills about half area of a μRA 112 and the full aperture of the first objective 114. In this embodiment the first objective 114 is a 10× objective available from Nikon. The second μRA 118 is matched to the first μRA 112, and the second objective 120 is substantially identical to the first objective 114. The second 10× objective 120 is configured as a condenser in transmittance to recover the expanded beam size so that wave front is recovered to the same polarization states as the incident light after the second μRA 118.

The photodiode 126 in this embodiment is a Thorlabs model DET-10A. The polarizer 122 in this embodiment is configured to pass the horizontal polarized light.

The digital analyzer 130 includes waveform digitizer operably connected to digitize the signals generated by the photodiode. The waveform digitizer may suitably be one or more PCI-E digitizer oscilloscope cards such as the AlazarTech ATS-9462. The digital analyzer 130 also includes a lock-in analyzer 128 to enable use of a reference signal 108, discussed further below, to obtain the QPI information from signals received from the photodiode 126. In this embodiment, the lock-in analyzer 128 is a Stanford Research Systems model SR810 lock-in analyzer.

It will be appreciated that the first and second objectives 114, 120 define a measurement space 132 therebetween. In general, the sample 116 (particles in suspension) are disposed such that ADIC 101 performs measurement on the particles dispersed in the measurement space 132.

Figure 2:
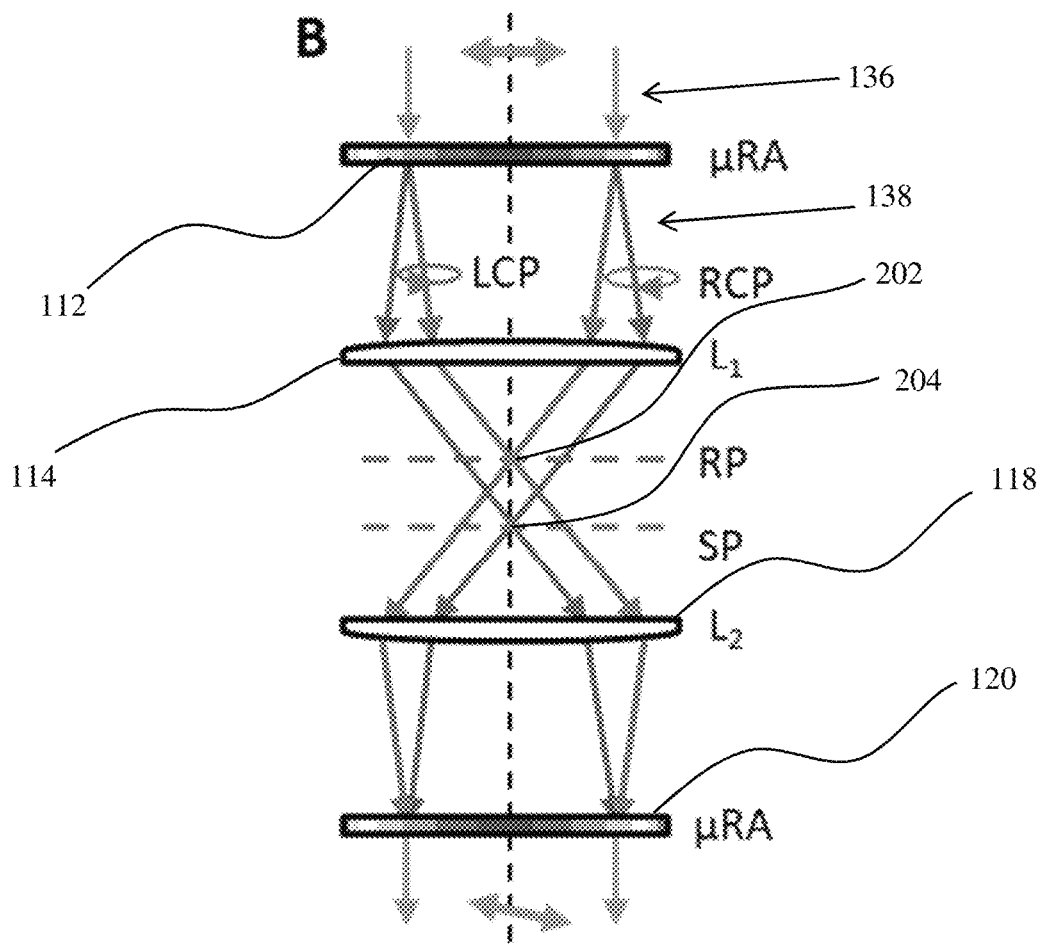
FIG. 2 shows a representative diagram of a portion of the system of FIG. 1.

FIG. 2 shows a representative diagram of the measurement space 132 in further detail. In particular, under operation of the ADIC 101 described herebelow, the light beam is polarized and otherwise acted upon by the micro-retarder array 112 to generate two focal points (or areas) 202, 204. As will also be discussed below, the two focal points are axially spaced apart. In general, the particles in suspension (i.e. the sample) are passed through the second focal area 204, while a reference substance, such as a glass plate, is disposed at the first focal point. It will be appreciated that the orientation of FIG. 2 is the opposite of FIG. 1.

As shown in FIG. 2, the first μRA 112 is designed to introduce half-wave retardance at different positions with varying fast-axis orientation. The polarization pattern resulting from the first μRA 112 is identical to that produced by the interference between a slightly diverging right circularly polarized plane wave RCP and a slightly converging left circularly polarized plane wave LCP. This patterned wavefront consequently focused the two orthogonally polarized components to two different axially offset foci 202, 204. Based on the design of the first μRA 112, the two focus planes are separated in the direction of the optic axis (z-axis) in which the light is transporting. In absence of the sample, the two orthogonal polarized components are coherently recombined as linearly polarized plane wave after passing through the matched second μRA 120 such that no photons are detected at the cross-polarized orientation. With sample 116 in one of the two foci (e.g. 204), phase change and scattering will change the polarization of the recombined beam, producing photon signals at the detector 126 of FIG. 1.

As shown in FIG. 2, in the ADIC 101, the two foci 202, 204 serve as the reference plane RP and sample plane SP, respectively. The two focus planes RP and SP distributed in the z-axis. In this embodiment, the first μRA 112 (and second μRA 120), are designed such that the reference plane RP and sample plane SP are separated in a distance of 70 μm with a 10× objective 114. For measurements as described herein, the reference focus plane RP is placed in a uniform medium, such as a glass slide. As such, particles diffusing through the sample focal volume SP give rise to fluctuations of the phase-contrast intensities measured in cross or quadrature. As will be discussed below, the recorded autocorrelogram is then used to recover the size distribution of nanoparticles in probability density function after post processing. This method utilizes the intrinsic phase contrast mechanism arising from differences in refractive index to achieve label-free sensitive particle analysis.

Figure 3:
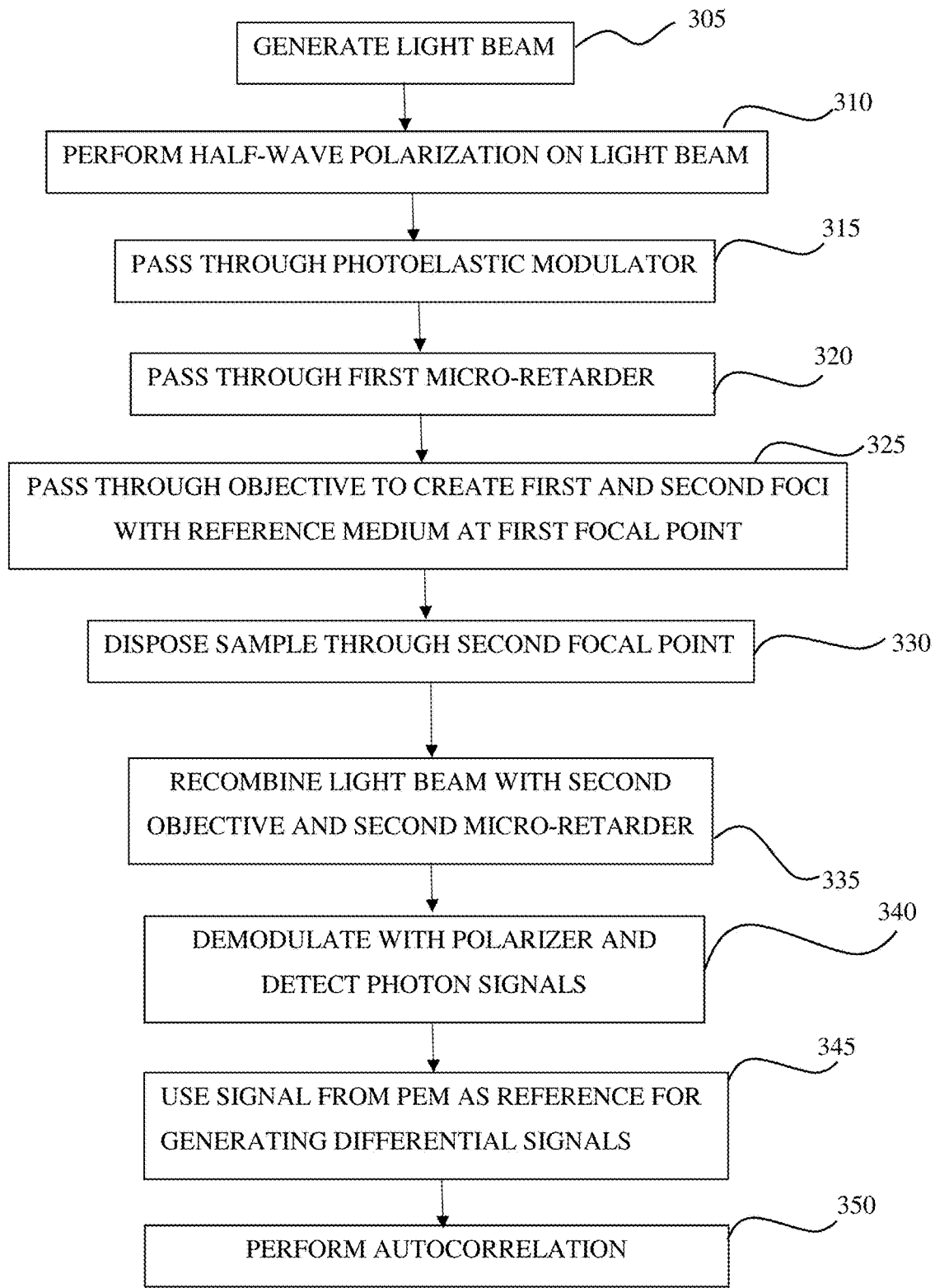
FIG. 3 shows a flow diagram of an exemplary method for generating an optical signal representative of the particle size distributions in nanocrystal suspensions.

FIG. 3 shows a flow diagram of a method of operating the system 100 according to an embodiment that performs analysis on particles.

In step 305, the light beam source 102 generates a light beam 134. In step 310 the HWP 104 performs half-wave polarization on the light beam 134. As will be discussed below in detail, the HWP 104 may be rotated on its fast axis as a function of time. In step 315 the light beam 134 is passed through the photoelastic modulator 106a and the quarter-wave plate 106b. The photoelastic modulator 106a and QWP 106b propagate the polarized light beam 136 to the reflector 110, and further provide a reference beam 108 having the same polarization to the digital analyzer 130. The reflector 110 directs the polarized light beam 136 to the first µRA 112.

In step 320 the first µRA 112 generates a polarization wavefront shaped light beam 138. (See also FIG. 2). To this end, the first µRA 112 is configured to introduce half-wave retardance at different positions with varying fast-axis orientation. FIG. 2, discussed above, shows the operation of the first µRA 112 on the light beam 136. The polarization pattern resulting from the first µRA 112 is identical to that produced by the interference between a slightly diverging right circularly polarized plane wave RCP and a slightly converging left circularly polarized plane wave LCP.

Referring again generally to FIG. 3, in step 325, the polarization wavefront shaped light beam 138 passes through the first objective 114 to create first and second focal points 202, 204 (see FIG. 2). Specifically, the first objective 114 consequently focuses the two orthogonally polarized components RCP, LCP to the two different axially offset foci 202, 204. Based on the design of the first µRA 112, the planes of the two focal points 202, 204 are separated in the direction of the optic axis (z-axis) in which the light is transporting.

Referring again to FIG. 3, in step 330 the sample 116 is disposed at the second focal point 204 (see FIG. 2). It will be appreciated that, as a matter of timing, the sample 116 will typically be disposed at the second focal point 204 prior to step 102. A 3-dimensional translational stage was used to place the sample at beam focus.

In any event, the light from the first objective 114 passes through a reference sample at the first focal point 202 and the sample 116 at the second focal point 204 to generate a measurement optical signal having intensity and phase information regarding the particles in the sample 116.

Thereafter, in step 335, the measurement optical signal, in other words, the light beam with the axially separated focal points, is recombined by the second objective 118 and the second µRA 120 to generate a combined beam. It will be appreciated that the second objective 118 and the second µRA 120 are matched to the first µRA 112 and first objective 114 such that, in absence of the sample 116 (or any sample), they coherently recombine the two orthogonal polarized components 305, 310 as a linearly polarized plane wave such that the photodetector 126 detects no photons at the cross-polarized orientation. However, with particles of the sample 116 in one of the two foci, e.g. focal point 204, phase change and scattering will change the polarization of the recombined beam, producing photon signals at the photodetector 126.

Thereafter, the recombined beam 140 passes through the polarizer 122 and lens 124 to generate resulting light signal that is detected by the photodiode 126. In step 340, the photodiode 126 converts the measurement light beam 142 into an electric measurement signal 144, and provides the electrical measurement signal to the digital analyzer 130.

In step 245, the digital analyzer 130 uses the reference signal 108 (which is also converted to electrical signals), and the electrical measurement signal 144, to generate differential signals having QPI information and intensity information, as a function of time. To this end, the electrical measurement signal 114 from the photodiode 126 is digitized at a 500 kHz sampling frequency, and simultaneously demodulated at 1f (50 kHz) and 2f (100 kHz) to retrieve the intensity as well as quantitative phase autocorrelograms of measured the sample (Step 350). In this embodiment, the autocorrelograms were generated from measurements over a duration time of 15 min.

Figure 4:
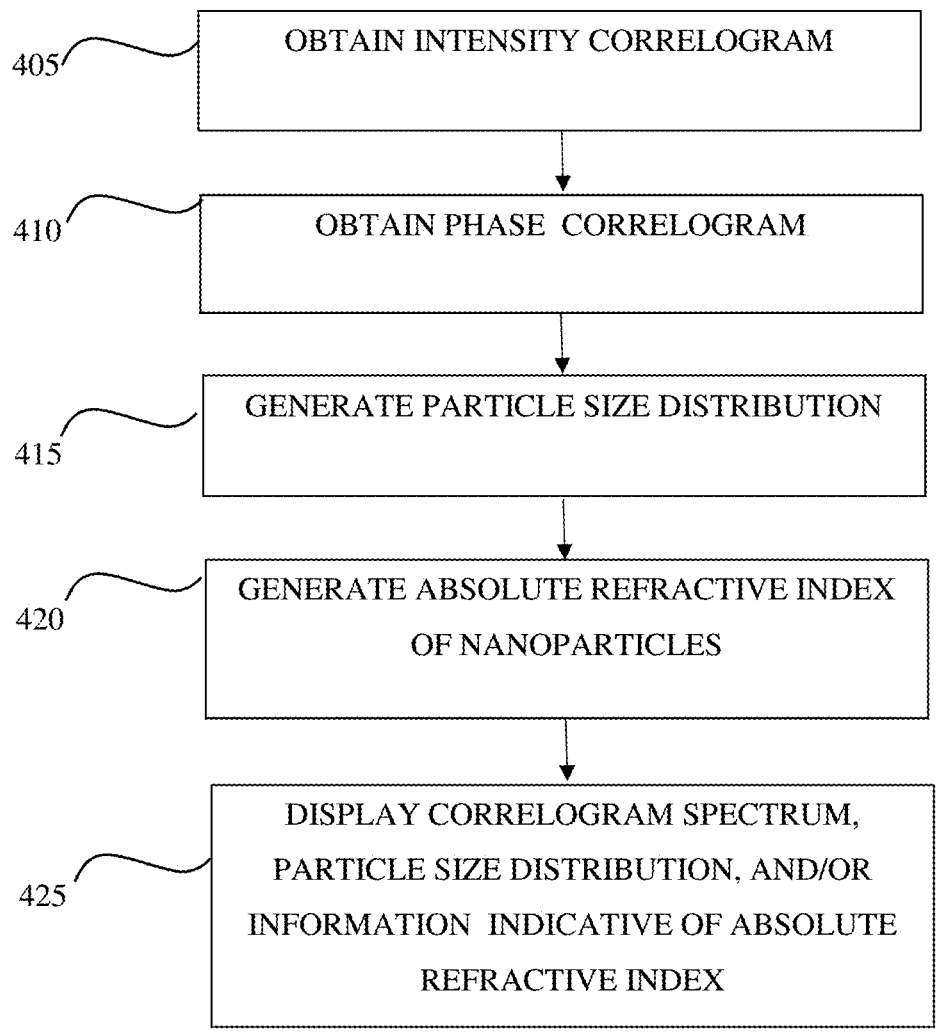
FIG. 4 shows a flow diagram of additional operations of the exemplary method of FIG. 3.
Figure 5A:
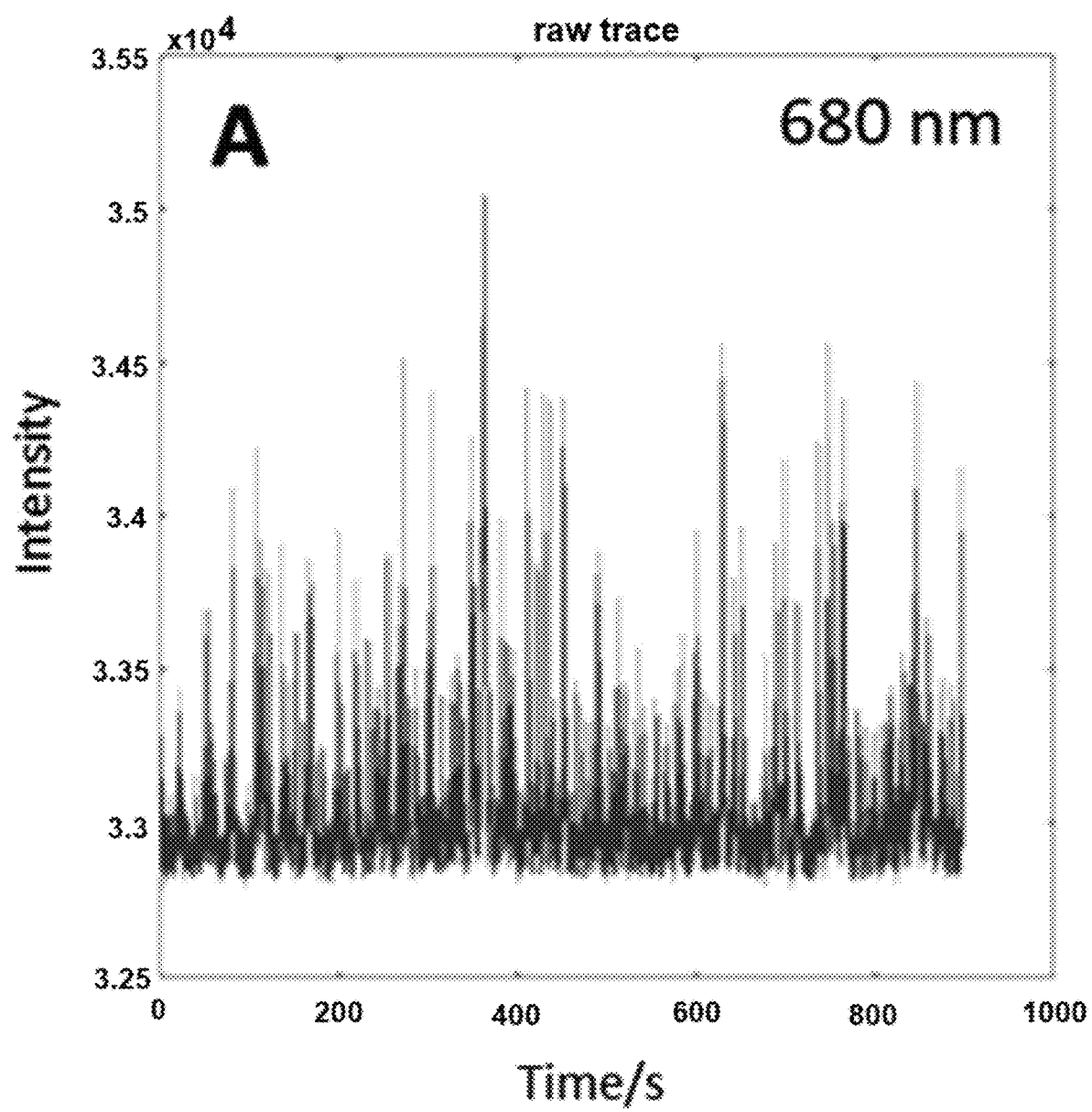
FIG. 5A shows a raw trace of intensity over time for an exemplary sample obtained in an experimental operation of an embodiment of the system of FIG. 1.
Figure 5B:
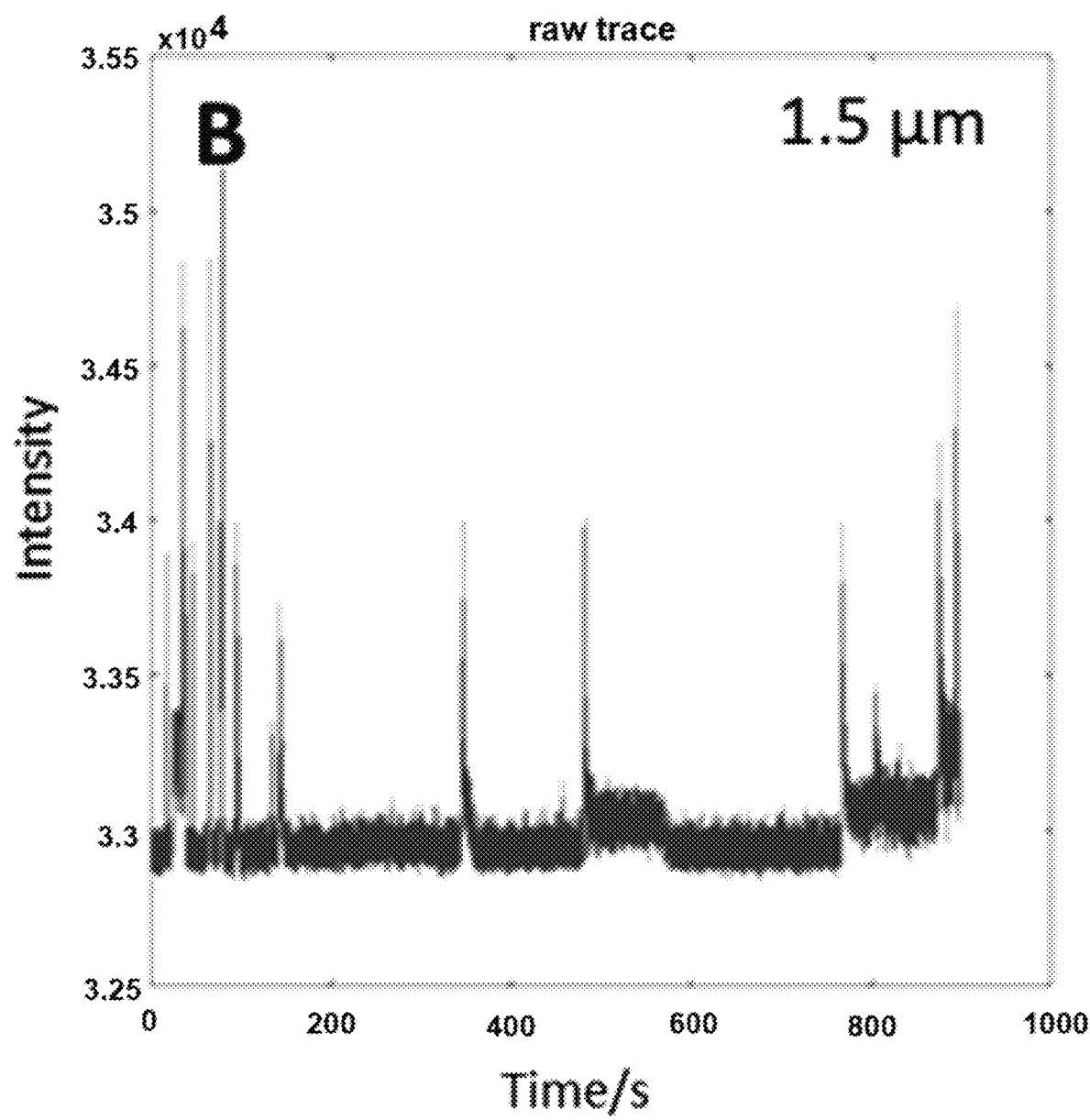
FIG. 5B shows a raw trace of intensity over time obtained for another exemplary sample in an experimental operation of an embodiment of the system of FIG. 1.
Figure 5C:
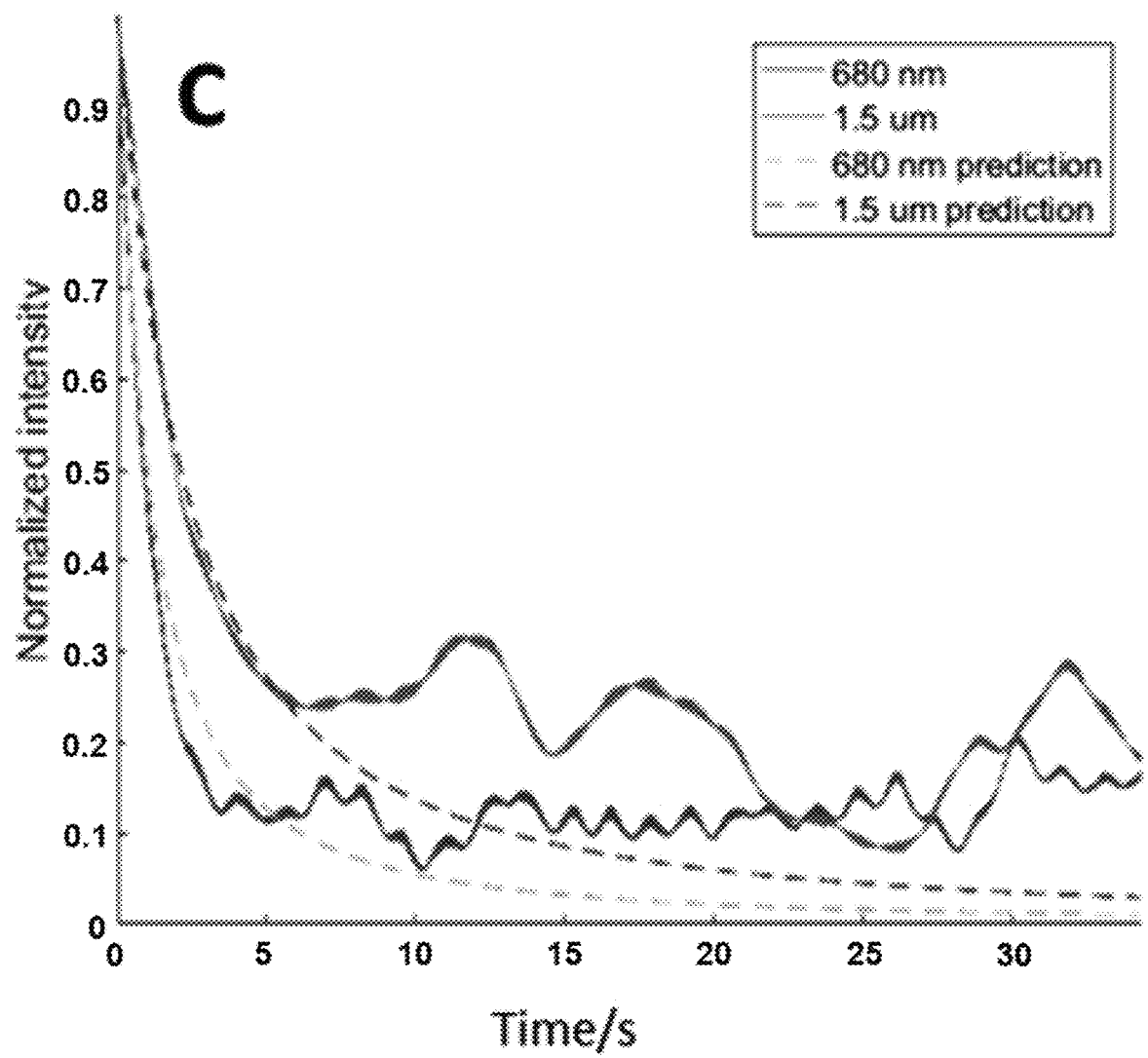
FIG. 5C shows a graph of a correlogram of the information from FIGS. 5A and 5B.

FIG. 4 shows in further detail processing operations of the digital analyzer 130. In steps 405 and 410, the digital analyzer generates an intensity correlogram and a contemporaneous quantitative phase correlogram. FIG. 5C discussed further below, show an exemplary graph of an intensity correlogram determined experimentally.

In step 415, the digital analyzer generates a particle size distribution based on the generated correlograms, using known methods. It will be appreciated that particle size distribution, as will be discussed below, can be generated without QPI, and thus can be carried out in an alternative embodiment of the ADIC 101 without the PEM 106a, QWP 106b, and the LIA 128. However, improved results are obtained when particle size distribution is determined using the both intensity and QPI regarding the sample 116.

Referring again generally to step 415, the time-dependent signal in the autocorrelogram in some embodiments is decomposed into slowly varying and modulated components. The slowly varying component can be fit to recover the particle size distribution using established methods. Fourier analysis of the modulated component (power) with time enables isolation of the interference term between sample and reference focal points for recovery of quantitative phase information.

Thereafter, in step 420, the digital analyzer 130 generate an absolute refractive index of the particles in suspension of the sample, based on the generated correlograms and/or the particle size distribution information.

In step 425, the digital analyzer 130 causes the results to be displayed (and stored in an associate memory), including any or all of the correlogram spectra, the particle size distribution, and information indicative or representative of the absolute refractive index.

Experimental Results
Correlation Spectroscopy Detected at Cross Polarized Direction Intensity correlation spectroscopy was achieved with horizontal polarized incidence and vertically polarized detection. In a first experiment, the PEM 106a and QWP 106b were not used, such that only the intensity correlograms were produced. FIGS. 5A and 5B show two raw intensity traces for 680 nm and 1.5 µm silica beads suspension measurements. The correlation spectroscopy retrieved in FIG. 5C exhibit difference between results obtained from two beads suspensions. The decay coefficient is larger for smaller beads as expected empirically. The measurement results are plotted with the prediction based on Eq. (1), in which the temporal autocorrelogram of τ the suspension for three-dimensional free diffusion is as a function of time τ and characteristic diffusion time $\tau_d$.

$$G(\tau \cdot \tau_d) = A \cdot \left(1 + \frac{\tau}{\tau_d}\right)^{-1} \cdot \left[1 + \left(\frac{w_0}{w_z}\right)^2 \frac{\tau}{\tau_d}\right]^{-1/2} + B \quad (1)$$

In Eq. (11), A and B are the amplitude and asymptotic value of the autocorrelogram as $\tau_d$ approaches infinity. Parameters A and B are set as 1 and 0 in this simulation for the normalized autocorrelogram. The value of $\tau_d$ is related to the particle diameter d as described in Eq. (12).

$$\tau_d = \frac{3\pi\eta w_0^2 d}{4k_B T} \quad (2)$$

The parameters $w_0$ and $w_z$ are the beam waist in the radial and axial directions (resolution), respectively.

In this experiment, $w_0$ and $w_z$ were set as 2 µm, which can be refined precisely by later experiment, and the value of the viscosity (η) of water at 25° C. (temperature, T) was used. The predicted results are shown in FIG. 6C in dash lines, which have agreement with the measurements (solid lines). The fluctuation for the asymptotic value in measurement results might be caused by electronic noise or insufficient sampling.

For absolute refractive index and related characterization of the particles in the sample 116, simultaneous measurement of both intensity and phase correlogram is enabled with digital lock-in detection, as described in detail in discussions of ADIC microscopy both above and in U.S. Pat. No. 11,009,456. The retrieved quantitative phase information and particle size distribution can be utilized to calculate the absolute refractive index of nanoparticles being measured, which is not accessible through conventional particle analysis method such as dynamic light scattering. Mathematical models for this part will be further developed.

In particular, polarization modulation measurements for quantitative phase information can be conducted with the system 100 via mechanical rotation of the HWP 104 from 0 to 90 degrees with 3 degree intervals. For fast polarization modulation coupled with detection by the LIA 128, the fast axes of the HWP 104 and QWP 106b are rotated to 22.5 degrees and 45 degrees, respectively, to make sure that the incident light becomes rapidly modulated linearly polarized light before entering the first µRA 112. The PEM 106a operates at 50 kHz, with both 1f (50 kHz) and 2f (100 kHz) outputs delivered as the reference signals to the LIA 128. Both the quadrature and in-phase components of the output of the LIAS 128 can be acquired simultaneously by the LIA. The integration time for LIA 128 was set as 30 µs.

The Jones vector describing the detected signal after the sample can be expressed through the Eq. (3) as a sum of changes from the two foci. In Eq. (3), $t_1$ and $t_2$ are sample transmittances from the two foci separately. δ is the phase change induced by the sample, with opposite signs for RCP and LCP focus planes (sample and reference planes).

$$e^{\overline{\text{det}}} = \frac{1}{2}\left(t_1 \cdot \begin{bmatrix} 1 & i \\ i & 1 \end{bmatrix} \cdot e^{i\frac{\delta}{2}} + t_2 \cdot \begin{bmatrix} 1 & -i \\ -i & 1 \end{bmatrix} \cdot e^{-i\frac{\delta}{2}}\right) \cdot \overline{e^0} \quad (3)$$

When a half wave plate is inserted to change the incident polarization states, the intensity detected through a polarizer at horizontal polarization state is given by the Eq. (4), in which γ is the rotated angle of half wave plate. The transmittance from the sample is recovered as $(t_1+t_2)^2$.

$$I(\gamma) \propto t_1^2 + t_2^2 + 2t_1 t_2 \cdot \cos(\delta + 4\gamma) \quad (4)$$

As discussed above, for the LIA detection, the PEM 106a and QWP 106b were placed between the HWP 104 and beam expansion (reflector 110), and the fast axis of HWP 104 and QWP 106b were rotated to 22.5 degrees and 45 degrees, separately. The detected signal intensity after a polarizer at horizontal polarization state can be written as Eq. (5). As shown in Eq. (6), A is the retardance modulation introduced by the PEM as a function of time (τ) with modulation amplitude of 2 A. The retardance modulation frequency for PEM was f=50 kHz.

$$I(\tau) \propto 2(t_1^2 + t_2^2) + 2t_1 t_2 \cdot \sin(A(\tau) - \delta) \quad (5)$$

$$A(\tau) = 2A \cdot \sin(2\pi f \tau) \quad (6)$$

When A is relatively small, the Taylor expansion of Eq. (5) is shown as Eq. (7) with the first seven power series, corresponding to the first four harmonics of the LIA detection. The approximation in Eq. (7) will result in negligible errors for the PEM modulation as long as A<π/2. In our experiments, the modulation amplitude of the PEM was set as A=0.3π.

$$I(\tau) \propto 2(t_1^2 + t_2^2) +$$

$$2t_1 t_2 \cdot \left\{ \begin{array}{l} \left[\left(2A - A^3 + \frac{A^5}{6} - \frac{A^7}{72} + \ldots\right) \cdot \sin(2\pi f \tau) + \right. \\ \left. \left(\frac{A^3}{3} - \frac{A^5}{12} + \frac{A^7}{120} + \ldots\right) \cdot \sin(3 \cdot 2\pi f \tau) + \ldots \right] * \cos\delta - \\ \left[\left(1 - A^2 + \frac{A^4}{4} - \frac{A^6}{36} + \ldots\right) + \left(A^2 - \frac{A^4}{3} + \frac{A^6}{24} + \ldots\right) \cdot \right. \\ \left. \cos(2 \cdot 2\pi f \tau) + \left(\frac{A^4}{12} - \frac{A^6}{60} + \ldots\right) \cdot \cos(4 \cdot 2\pi f \tau) + \ldots \right] \cdot \sin\delta \end{array} \right\}$$

According to Eq. (7), quadrature components (sin) only exist for odd harmonic elements while in-phase components (cos) only exist for even harmonic elements of the Taylor series. The quadrature components (sin) of the first harmonic (1f) and the in-phase components (cos) of the second harmonic (2f) LIA detection are written as Eq. (8) and Eq. (9), respectively.

$$1f\_\sin \approx 2t_1 t_2 \cdot \left(2A - A^3 + \frac{A^5}{6} - \frac{A^7}{72}\right) \cdot \cos\delta \quad (8)$$

$$2f\_\cos \approx 2t_1 t_2 \cdot \left(A^2 - \frac{A^4}{3} + \frac{A^6}{24}\right) \cdot \sin\delta \quad (9)$$

Combining Eq. (8) and Eq. (9) will result in the quantitative phase shift retrieval function shown below.

$$\tan\delta \approx \frac{2f\_\cos}{1f\_\sin} \cdot \frac{\left(2A - A^3 + \frac{1}{6}A^5 - \frac{1}{72}A^7\right)}{\left(A^2 - \frac{1}{3}A^4 + \frac{1}{24}A^6\right)} \quad (10)$$

Unlike the HWP rotation strategy, the transmittance image recovered from the LIA detection is defined as $t_1 t_2$ instead of $(t_1+t_2)^2$ since no DC components were collected from the LIA detection. It is noteworthy that the HWP rotation strategy can recover phase value in the range of [−π,π) while the LIA detection can only retrieve phase shift in the range of (−π/2,π/2) due to the limitation of inverse tangent.

To identify the locations of the focal point the process described in U.S. Pat. No. 11,009,456. The introduction of the large spatial offset between the two foci 202, 204 (roughly ¼ of the 250 µm×250 µm FoV) makes it possible to create a stable and uniform reference plane at the focal point 202, and place the reference plane in a homogeneous medium (e.g., glass, air, or solution), such that the imaging artifacts that are often encountered in Nomarski and Zernike phase contrast microscopy could be diminished.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A method of obtaining intensity and quantitative phase information representative of the particle size distributions in nanocrystal suspensions, comprising:
   a) providing a first light beam along a first axis to a first micro-retarder array to generate polarization wavefront shaped light;
   b) applying the polarization wavefront shaped light to an objective configured to focus two orthogonally polarized components of the polarization wavefront shaped light to produce first and second axially offset foci along the first axis;
   c) disposing a sample having particles in suspension in at least one of the first and second axially offset foci to produce a measurement optical signal having phase and intensity values corresponding to at least some of the particles in suspension;
   d) applying the measurement optical signal to a second objective and a second micro-retarder to generate recombined light; and
   e) generating electrical measurement signals representative of the measurement optical signal from the recombined light over time; and
   f) determining intensity and quantitative phase information as a function of time based on the electrical measurement signals.

2. The method of claim 1, further comprising generating particle size information of the sample based on the determined intensity and quantitative phase information.

3. The method of claim 1, further comprising determining the absolute refractive index of particles in suspension sample using the determined intensity and quantitative phase information.

4. The method of claim 1, wherein the second micro-retarder is configured and positioned to recombine the polarization wavefront shaped light to a linearly polarized plane wave in absence of the disposed sample.

5. The method of claim 1, wherein step f) further comprises generating intensity correlogram information based on the electrical measurement signals.

6. The method of claim 5, wherein step f) further comprises generating a phase correlogram based on the electrical measurement signals.

7. The method of claim 6, further comprising generating a particle size distribution of the sample.

8. A method of obtaining intensity information representative of the particle size distributions in nanocrystal suspensions, comprising:
   a) providing a first light beam along a first axis to a first micro-retarder array to generate polarization wavefront shaped light;
   b) applying the polarization wavefront shaped light to an objective configured to focus two orthogonally polarized components of the polarization wavefront shaped light to produce first and second axially offset foci along the first axis;
   c) disposing a sample having particles in suspension in at least one of the first and second axially offset foci to produce a measurement optical signal having intensity values corresponding to at least some of the particles in suspension;
   d) applying the measurement optical signal to a second objective and a second micro-retarder to generate recombined light; and
   e) generating electrical measurement signals representative of the measurement optical signal from the recombined light over time; and
   f) determining intensity information as a function of time based on the electrical measurement signals.

9. The method of claim 8, further comprising generating a particle size distribution of the sample based on the determined intensity information as a function of time.

* * * * *